United States Patent [19]

Kanai et al.

[11] Patent Number: 5,071,156

[45] Date of Patent: Dec. 10, 1991

[54] VEHICLE REAR SUSPENSION SYSTEM

[75] Inventors: Seita Kanai, Hiroshima; Takeshi Edahiro, Higashihiroshima, both of Japan

[73] Assignee: Mazda Motor Corporation, Hiroshima, Japan

[21] Appl. No.: 587,657

[22] Filed: Sep. 26, 1990

Related U.S. Application Data

[63] Continuation of Ser. No. 385,455, Jul. 27, 1989, abandoned.

[30] Foreign Application Priority Data

Jul. 28, 1988 [JP] Japan ................................ 63-188884

[51] Int. Cl.[5] ................................................ B60G 3/00

[52] U.S. Cl. .................................... 280/690; 280/668; 280/725

[58] Field of Search ............... 280/690, 696, 670, 668, 280/725

[56] References Cited

U.S. PATENT DOCUMENTS

| | | | |
|---|---|---|---|
| 4,500,111 | 2/1985 | Woo | 280/690 |
| 4,511,160 | 4/1985 | Inoue | 280/690 |
| 4,530,514 | 7/1985 | Ito | 280/690 |
| 4,650,209 | 3/1987 | Sumimoto | 280/690 |
| 4,690,426 | 9/1987 | Kubo et al. | 280/690 |
| 4,754,992 | 7/1988 | Asanuma | 280/690 |

FOREIGN PATENT DOCUMENTS

| | | |
|---|---|---|
| 60-61318 | 4/1985 | Japan . |
| 61-59107 | 4/1986 | Japan . |
| 62-80104 | 4/1987 | Japan . |
| 62-80105 | 4/1987 | Japan . |
| 62-134310 | 6/1987 | Japan . |

*Primary Examiner*—Kenneth R. Rice

*Attorney, Agent, or Firm*—Fleit, Jacobson, Cohn, Price, Holman & Stern

[57] ABSTRACT

A vehicle rear suspension system includes a wheel carrying member for rotatably carrying a wheel of a vehicle, three lateral links extending in a transverse direction and connected with the wheel carrying member at their outer ends, and a trailing arm extending in a longitudinal direction. The trailing arm is connected with a body member of the vehicle at front end through a single joint. The trailing arm is formed with biforked portions at a rear end extending in the up and down direction. One of the biforked portions is connected with a lower one of the three lateral link and the other of the biforked portions is connected with an upper one of the three lateral links or the wheel carrying member. The number of connecting points or joints between the trailing arm and the wheel carrying member can be reduced with an improved controllability of wheel attitude.

7 Claims, 5 Drawing Sheets

FRONT
L
1
10
9b
13
13c
7
8
9
9a
6
4
2
6
3
7
7
5
6
B

VEHICLE REAR SUSPENSION SYSTEM

This application is a continuation of application Ser. No. 07/385,455, filed July 27, 1989, now abandoned.

BACKGROUND OF THE INVENTION

1. Field of the Invention

The present invention relates to a vehicle suspension system, and more specifically, to a rear suspension system for a motor vehicle.

2. Description of the Prior Art

Conventionally, known vehicle rear suspension systems, as those shown in U.S. Pat. Nos. 4,754,992 and 4,690,426, comprise a wheel carrying member for rotatably carrying a vehicle wheel, three lateral links extending outwardly in a transverse direction of a vehicle body and connected to the wheel carrying member at the outer ends thereof, and a trailing arm or longitudinal member extending in a longitudinal direction of the vehicle body and connected to the wheel carrying member at a rear end thereof so as to control a toe angle and a camber angle of the wheel when the wheel is bumped to move upward relative to the vehicle body and rebounded to move downward relative to the vehicle body during running of the vehicle.

In order to control the toe angle of the wheel, Japanese Utility Model Public Disclosure No. 61-59107, laid open to the public in 1986, discloses a rear suspension in which the trailing arm is swingably connected with the wheel carrying member at a rear end about an axis extending in an up and down direction while a relative movement between the trailing arm and the wheel carrying member along the axis is restricted.

With this suspension system, the trailing arm is constituted by a pair of links spaced from each other in the up and down direction or a plate member having a large enough dimension in the up and down direction and connected with the wheel carrying member at the rear end through at least two points spaced in the up and down direction for supporting the wheel carrying member with regard, particularly, to a moment acting on the wheel carrying member about a wheel axis as well as a longitudinal force acting on thereon through the wheel. As aforementioned, the three lateral links are also connected with the wheel carrying member, respectively. It may be difficult, therefore, to connect all such members to the wheel carrying member in a desirable arrangement. In a case where the trailing arm is constituted by a pair of links, it is desirable to provide a rubber disposed at a connecting point between the link and the wheel carrying member with a soft resilient property from a point of riding comfort. However, such soft resilience may cause a problem such as a brake judder.

Japanese Patent Public Disclosure No. 60-61318, laid open to the public on Apr. 9, 1985, discloses a rear suspension provided with a trailing arm and three lateral links, wherein the trailing arm, extending longitudinally, is connected with the wheel carrying member at a rear end, and one of the three lateral links is connected with the trailing arm through another link. This structure, disclosed in the Japanese Patent Public Disclosure No. 60-61318, is advantageous in that the number of connecting point at the wheel carrying member can be reduced, and brake judder can be prevented. An improvement in riding comfort is also provided.

It should, however, be noted that the suspension of the Japanese Patent Public Disclosure No. 60-61318 is disadvantageous in controllability of a wheel attitude, since the wheel tends to produce a toe-out movement.

SUMMARY OF THE INVENTION

It is, therefore an object of the invention to provide a vehicle rear suspension system which can reduce the number of connecting points at a wheel carrying member to facilitate an arrangement of members connected with the wheel carrying member.

It is another object of the invention to provide a vehicle rear suspension system with an improved controllability of the wheel attitude during running of the motor vehicle.

It is still another object of the invention to provide vehicle rear suspension system which can prevent a brake judder effectively under a braking condition.

It is a further object of the invention to provide a vehicle rear suspension system by which an improved riding comfort can be obtained.

According to the present invention, a vehicle rear suspension system comprises wheel carrying means for rotatably carrying a wheel of a vehicle, three lateral link means extending in a transverse direction of the vehicle and connected with the wheel carrying means at outer ends, and trailing arm means extending in a longitudinal direction. The trailing arm means is connected with a body member of the vehicle at one end through single pivotal joint means. The trailing arm means is formed at a rear end with biforked portions spaced from each other in an up and down direction. One of the biforked portions, constituting a main body portion of the trailing arm means, is connected with a lower lateral link means of the three lateral link means, and the other of the biforked portions is connected with either an upper lateral link means of the three lateral link means or the wheel carrying means.

The biforked portion constituting the main body of the trailing arm means may be connected with the upper lateral link means. In this case, the other of the biforked portions is connected with either the lower lateral link means or the wheel carrying member.

Preferably, the biforked portions are flexible to change a distance therebetween. One of the three lateral link means, which is not connected with the biforked portions, may be movably provided in a transverse direction of the vehicle.

According to the present invention, the number of connecting points or joints between the trailing arm means and the wheel carrying means can be reduced.

A joint between the biforked portions of the trailing arm means is preferably rigid in the longitudinal direction, and the single pivotal joint between the trailing arm and the body member is relatively soft or resilient, so that the brake judder can be restricted and the riding comfort can be improved.

In a preferred embodiment, the biforked portions are pivotally connected with each other in the up and down direction to change the distance therebetween enough to allow the upper and lower joints of the biforked portions to produce a relative displacement.

One of the three lateral link means, which is not connected with the biforked portions, is preferably movably provided in the transverse direction for steering the wheel by virtue of a driving means such as a hydraulic cylinder device so that transverse movement of the one lateral link means is not affected, even when a longitudinal force acts on the wheel during running to accomplish a desirable steering control for the wheel.

In facilitating a wheel attitude control, such as toe angle and camber angle controls, a king pin axis, or a hypothetical steering axis of the wheel about which the wheel is steered, is positioned as close to a wheel center line, extending longitudinally, as possible. With regard to the structure of the suspension system in accordance with the present invention, the king pin axis is defined by a line passing through a connecting point between a lower lateral link means and the wheel carrying means and a connecting point between an upper lateral link means and the wheel carrying means. This enables the king pin axis to be positioned closely to the wheel center line so that the wheel attitude control can be facilitated.

The above and other objects and features of the present invention can be understood based on the following description taking reference with the accompanying drawings.

DESCRIPTION OF THE PREFERRED EMBODIMENTS

Figure 1:
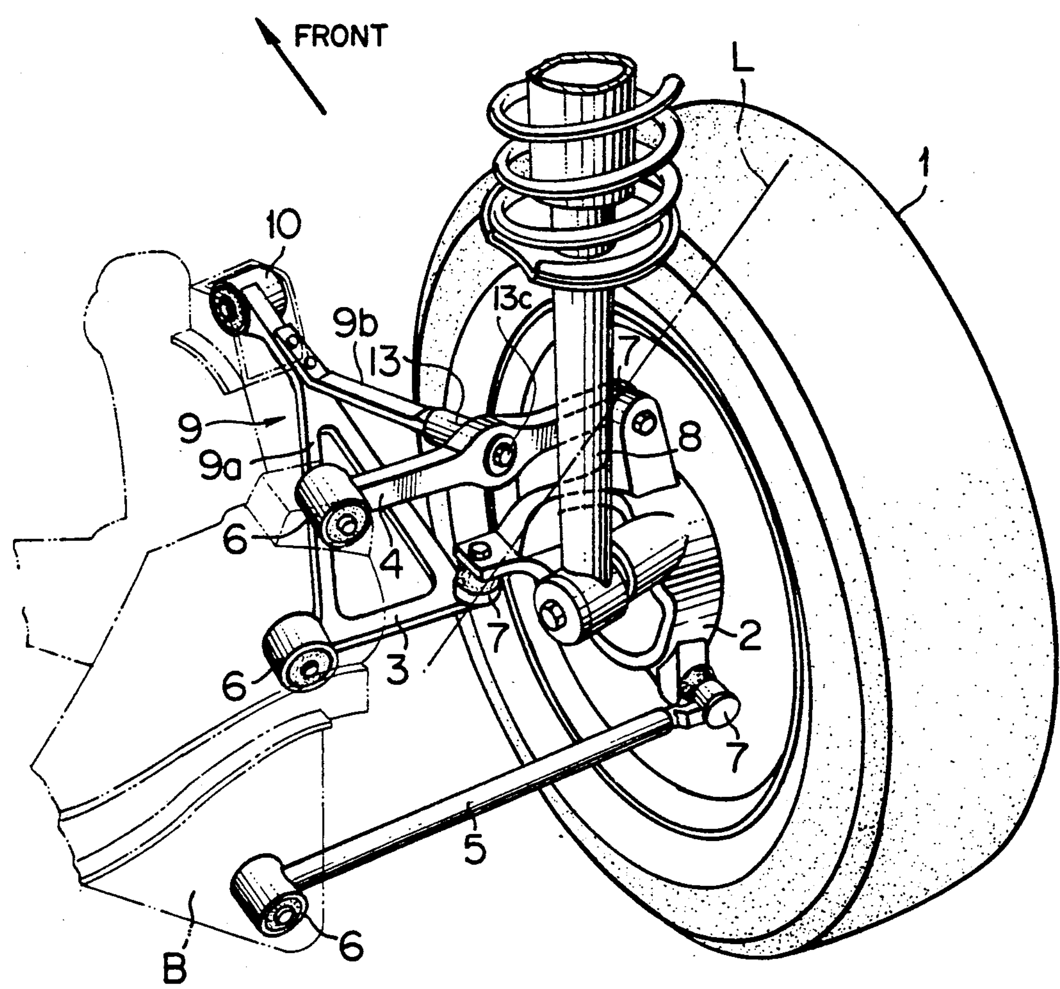
FIG. 1 is a perspective view of a suspension system in accordance with the present invention.

Referring to the drawings, and specifically to FIG. 1, there is shown a vehicle rear suspension system in accordance with the present invention.

The suspension system comprises a wheel carrying member 2 for rotatably carrying a rear wheel 1 with a tire, a first lateral link 3, a second lateral link 4 and a third lateral link 5 extending in a transverse direction of a vehicle. Each of the lateral links 3, 4 and 5 is connected at its inner end with a subframe B of a vehicle body through an inner joint 6 having a rubber bushing for a swingable movement in an up and down direction and with the wheel carrying member 2 at its outer end through a ball joint 7.

The lateral link 4 is disposed above the first and third lateral link 3 and 5. The third lateral link 5 is disposed rearward of the first and second lateral links 3, 4.

The suspension system is provided with a shock absorber 8 for reducing vibration of the wheel 1 in the up and down direction. A lower end of the shock absorber 8 is coupled with the wheel carrying member 2.

Figure 2:
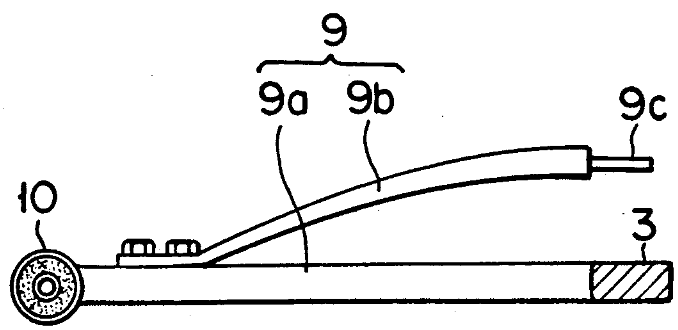
FIG. 2 is a side view of a trailing arm employed in the suspension system of FIG. 1.

The suspension system further comprises a trailing arm 9 extending in a longitudinal direction of the vehicle. Referring to FIG. 2 in addition to FIG. 1, the trailing arm 9 is of a rearward biforked configuration, that is, the trailing arm 9 is provided with a first arm **9*a*, constituting a main body portion thereof, and a second arm 9*b* fixed to the first arm 9*a* at a front end and extending rearwardly upwardly. The first arm 9*a* is integrally formed with the first lateral link 3 which connects a lower and front end of the wheel carrying member 2 with a vehicle body. A front end of the first arm 9*a* is connected with the body member through a single front joint 10 having a rubber bushing for a swinging or pivoting movement in the up and down direction. The first arm 9*a* is of a transversely biforked or V-shaped configuration and integrally connected with the first lateral link 3 at rear ends thereof. Namely, the biforked ends of the first arm 9*a* are integrally coupled with an inner end portion and an outer end portion, respectively of the first lateral link 3** to form a one piece member of a substantially triangle shaped outline with a triangle shaped opening therein.

Figure 3:
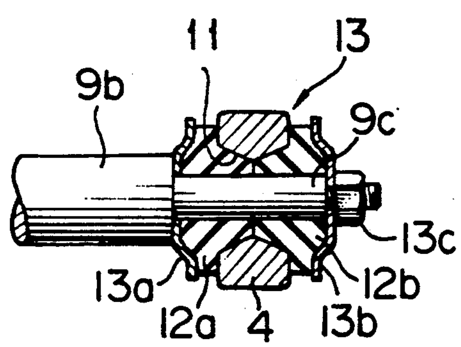
FIG. 3 is a sectional view of a joint between a second arm of the trailing arm and a lateral link of the suspension system.

The second arm **9*b*, constituting the other biforked portion of the trailing arm 9, is made of a resilient material such as FRP and is decreased in thickness toward the joint to the first arm 9*a* so that a distance between rear ends of the first arm 9*a* and the second arm 9*b* is changeable, since the resilience of the arm 9*b* enables a relative movement between the first and second arms 9*a* and 9*b* in the up and down direction. A rear end of the second arm 9*b* is joined with a middle portion of the second link 4 in an axial direction of the second link 4 through a pivotal joint 13. As shown in FIG. 3, the second arm 9*b* is formed at a rear end portion with a rod-like joint portion 9*c* extending rearwardly. The joint portion 9*c* is inserted into an opening 11 of the second link 4 and joined with the link 4 through a pair of rubber bushings 12*a*, 12*b* disposed on opposite sides of the second link 4 between a pair of seat members 13*a*, 13*b* which are secured by a nut 13*c*. The rubber bushings 12*a*, 12*b*, the seat members 13*a*, 13*b* and nut 13*c* constitute the joint 13. The second arm 9*b* is allowed to make a swinging or pivotal movement about a longitudinal axis of the second link 4 due to the rubber bushings 13*a*, 13*b***.

With this structure, a king pin axis is defined by a line L passing through a connecting point or the ball joint 7 between the first lateral link 3 or lower lateral link and the wheel carrying member 2 and a connecting point between the second lateral link 4 or an upper lateral link and the wheel carrying member 2. Thus, the king pin axis L is positioned closely to a wheel center line with regard to the transverse direction of the vehicle so that the wheel attitude control can be facilitated.

Figure 4:
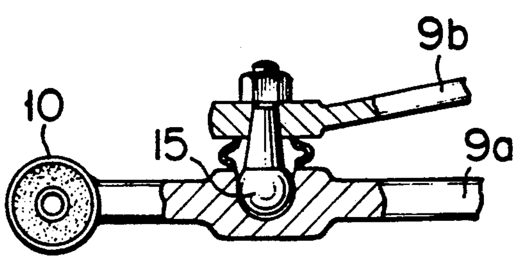
FIG. 4 is a partial sectional view of a joint between a first and the second arm of the trailing arm of the suspension system according to another embodiment of the invention.

Referring to FIG. 4, there is shown another joint structure between the first are **9*a* and the second arm 9*b*. In this embodiment, the second arm 9*b* is connected with the first arm 9*a* through a ball joint 15 which allows a relative movement between the first arm 9*a* and the second arm 9*b*** in the up and down direction to change the distance between the rear ends thereof.

Figure 5:
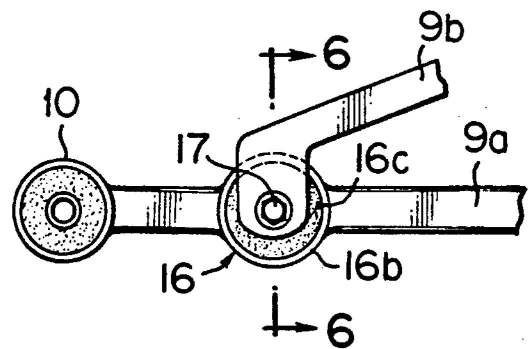
FIG. 5 is a plan view of a joint between the first and second arms of the trailing arm but showing still another embodiment of the present invention.
Figure 6:
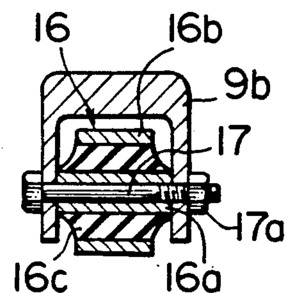
FIG. 6 is a sectional view taken along a line B—B in FIG. 5.

Referring to FIGS. 5 and 6, still another embodiment is shown. In this embodiment, the first arm **9*a* is connected with second arm 9*b* through a joint device 16 which is constituted by an outer cylinder 16*b* integrally connected with the first arm 9*a*, an inner cylinder 16*a*** disposed within the outer cylinder 16*b*, a rubber bushing 16*c* disposed between the inner and outer cylinders 16*a*, 16*b*, and a bolt-like shaft member 17 extending horizontally transversely and inserted in the inner cylinder 16*a*. The second arm 9*b* is formed at front ends thereof with biforked portions connected with opposite ends of the shaft member 17 through a nut 17*a* so that the second arm 9*b* can make a swinging movement relative to the first arm 9*a* in the up and down direction.

Figure 7:
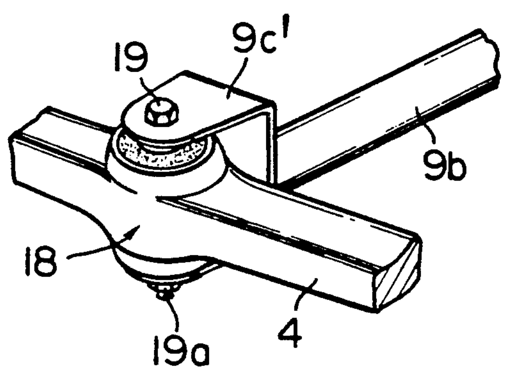
FIG. 7 is a perspective view showing a joint between the second arm of the trailing arm and a lateral arm in accordance with further embodiment of the present invention.

Referring to FIG. 7, there is shown another joint structure between the second arm 9*b* and the second link 4. The second arm 9*b* is formed at the rear end with a biforked portion 9*c'* connected with opposite ends of a bolt-like shaft member 19 extending in the up and down direction by means of a nut 19*a*. The shaft member 19 passes through a joint device 18 having a similar structure to the joint device 16 so that the second arm 9*b* is joined with the second link 4 through the joint structure 18 at the rear end for a swinging movement in the up and down direction as well as in the transverse direction.

The second arm 9*b* may be connected with the second link 4 through a pillow ball.

It will be understood from the above structure that the rear ends of the first and second arms 9*a* and 9*b*, which together define the trailing arm 9, are joined with the second lateral link 4 rather than the wheel carrying member 2. Thus, an arrangement of the members to be connected with the wheel carrying member 2 can be facilitated. The trailing arm is formed at the rear end portions with the biforked portions divided in the up and down direction and connected with the first and second lateral links 3, 4, respectively, at the rear end to bear against a force or moment about the wheel center effectively under a braking condition and the like.

The front joint 10 may have a soft rigidity property for improving a riding comfort. However, in this case, the joint structure between the first and second arm 9*a* and 9*b* is relatively rigid for preventing an undue vibration of the vehicle such as a brake judder as may occur in a braking condition of the vehicle. Thus, according to the illustrated embodiments of the invention, the riding comfort can be improved and brake judder can be effectively prevented.

The joint between the rear end of the first arm 9*a* of the first lateral link 3 and the joint between the second arm 9*b* and the second lateral link 4 can be displaced relative to each other in the up and down direction to change the distance therebetween in the case where the wheel 1 undergoes a bumping action, wherein the wheel is moved upwardly relative to the vehicle body, and a rebounding action, wherein the wheel is moved downwardly relative to the vehicle body, during running operation. This feature of the trailing arm 9 facilitates the lateral links 3, 4 and 5 and the like in accomplishing a desirable attitude control of the wheel 1, such as toe angle and a camber angle controls.

Figure 8:
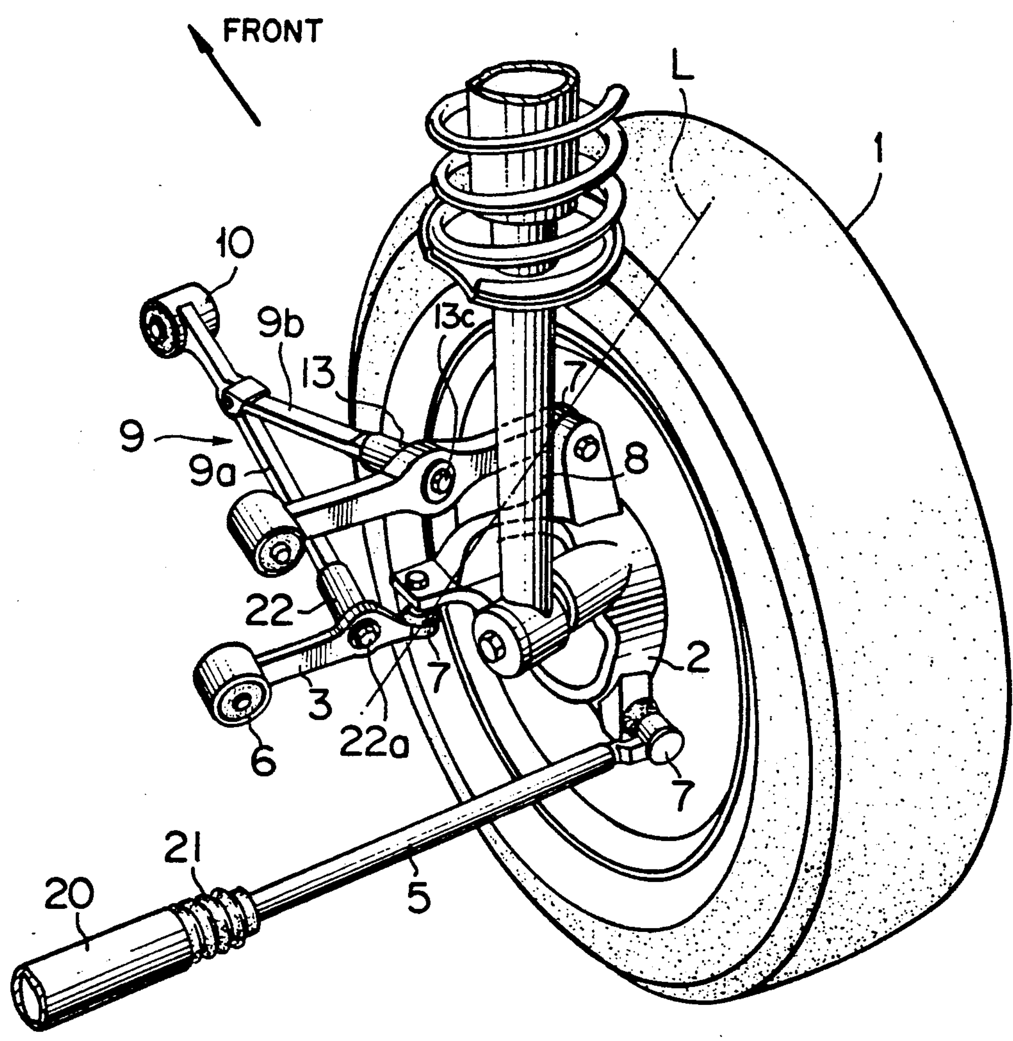
FIG. 8 is a perspective view of the suspension system similar to FIG. 1 in accordance with further embodiment.

Referring to FIG. 8, there is shown a further embodiment of the present invention, wherein the invention is applied to a so-called four wheel steering vehicle, in which a steering action occurs in both front and rear wheels of the vehicle.

In this embodiment, the third lateral link 5 constitutes a tie rod which is connected with a rear wheel steering mechanism such as a hydraulic cylinder 20 through a ball joint 21 at an inner end. The third lateral link 5 is movable in the transverse direction of the vehicle or an axial direction thereof in accordance with an operation of the hydraulic cylinder for steering the rear wheel 1. Any steering mechanism presently known to the public such as that disclosed in U.S. Pat. No. 4,732,231, can be employed for the steering control of the wheel 1. It will be understood from the drawings that the third lateral link 5 is independently connected with the wheel carrying member 2 so that the steering control by the third lateral link 5 is not affected by movements of the wheel 1 and other members of the suspension system. For instance, even where a longitudinal force acts on the wheel 1 under a braking condition of the vehicle and the like, such longitudinal force does not produce any moment in the third lateral link 5, since no member other than the wheel carrying member 2 is not connected with the third lateral link 5 in the suspension system. The first arm 9*a* of the trailing arm 9 is constituted by a single bar-like member and connected at a rear end with the first lateral link 3 through a joint 22 having a nut 22*a*. The joint 22 is of a similar structure to the joint 13.

In another embodiment, the joint 22 is constituted by a joint as shown in FIG. 7.

Figure 9:
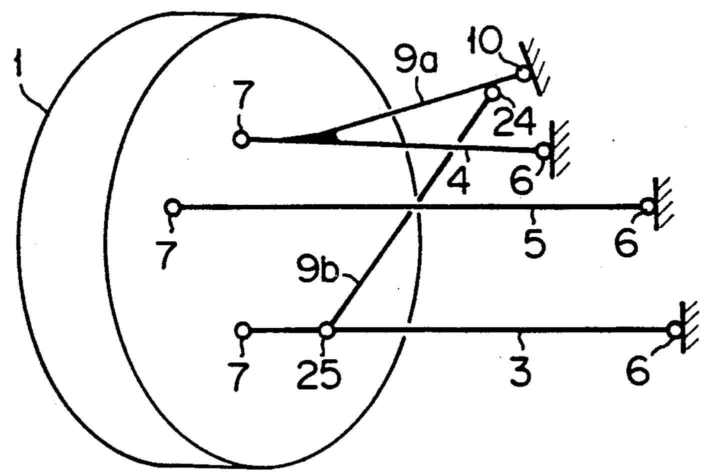
FIG. 9 through FIG. 11 are skeleton views showing suspension systems of different embodiments in accordance with the present invention respectively.
Figure 10:
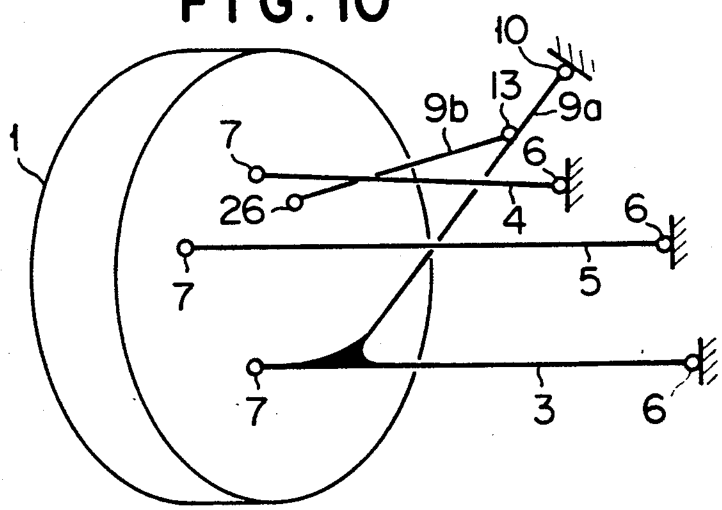
Figure 11:
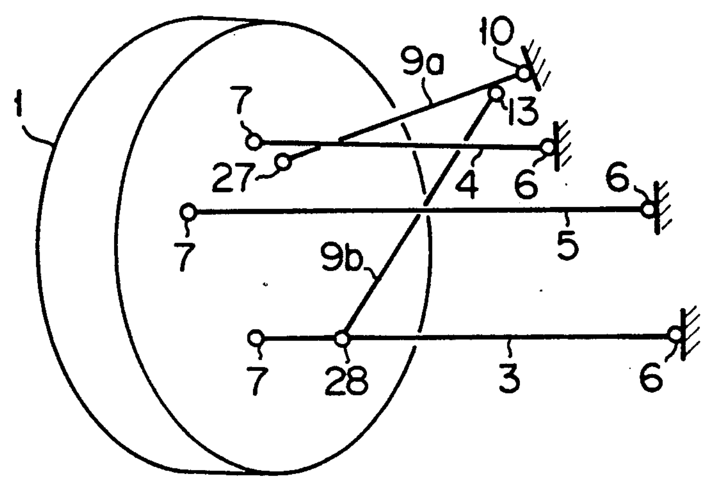

FIG. 9 through FIG. 11 shows further embodiments respectively.

Referring to FIG. 9, the first arm 9*a* of the trailing arm is connected with the second lateral link 4 through a rigid joint or is integrally connected with the second lateral link 4. The second arm 9*b* of the trailing arm 9 is connected at a front end with the first arm 9*a* through a pivotal joint 24 in the up and down direction. A rear end of the second arm 9*b* is connected with an intermediate portion of the first lateral link 3 connecting a lower and front portion of the wheel carrying member 1 with the vehicle body B through a pivotal joint 25 in the up and down direction.

Referring to FIG. 10, the first arm 9*a* is integrally connected with the first lateral link 3 or connected with the link 3 through a rigid joint. The second arm 9*b* is connected with the wheel carrying member 2 through a pivotal joint 26.

Referring to FIG. 11, the first arm 9*a* is connected with the wheel carrying member 2 through a pivotal joint 27. The second arm 9*b* is connected with the first lateral link 3 through a pivotal joint 28.

It will be apparent from the above description that many modifications and variations may be made by those skilled in the art without departing from the scope of the claimed invention as attached.

We claim:

1. A vehicle rear suspension system, comprising:

a wheel carrying member for rotatably carrying a rear wheel of a vehicle;

first, second and third lateral links, each having an inner end and an outer end and extending in a substantially transverse direction relative to the vehicle, the second lateral link being disposed above the first and third lateral links and the first lateral link being disposed forward of the third lateral link relative to the vehicle;

a single joint at the outer end of each of said lateral links for pivotally connecting said lateral links with the wheel carrying member, the single joint at the outer end of said second lateral link being disposed above the single joints at the outer ends of the first and third lateral links and the single joint at the outer end of said first lateral link being disposed forward of the single joint at the outer end of said third lateral link relative to the vehicle;

a single joint at the inner end of each of said lateral links for pivotally connecting said lateral links with at least one structural member of the vehicle;

a first arm and a second arm, together forming a biforked trailing arm, extending in a substantially longitudinal direction relative to the vehicle, said first arm and said second arm both extending rearwardly, relative to said vehicle;

a single front joint for resiliently connecting a front end of said biforked trailing arm with the structural member of the vehicle;

a first rear joint for pivotally connecting said first arm with an intermediate portion of the first lateral link, between the joints at the outer and inner ends thereof, at a rear end of said first arm; and a second rear joint for pivotally connecting said second arm with an intermediate portion of the second lateral link, between the joints at the outer and inner ends thereof, at a rear end of said second arm.

2. A vehicle rear suspension system as recited in claim 1, wherein said first rear joint and said second rear joint each comprises at least one rubber bushing.

3. A vehicle rear suspension system as recited in claim 2, wherein each of said first and second lateral links includes an opening formed in its intermediate portion, and wherein said first arm and said second arm each includes a rod-like joint portion formed on its rear end, each rod-like joint portion being inserted into one of the openings through at least one of the rubber bushings.

4. A vehicle rear suspension as recited in claim 3, wherein each opening is coaxial with one of said first and second arms.

5. A vehicle rear suspension as recited in claim 1, wherein said first arm is connected with said single front joint at the front end of said biforked trailing arm, and said second arm is connected with a portion of said first arm near said single front joint.

6. A vehicle rear suspension system as recited in claim 1, wherein said single joint at the inner end of said third lateral link is connected with a mechanism for steering said rear wheel.

7. A vehicle rear suspension system as recited in claim 1, wherein said biforked trailing arm comprises means for permitting a distance between the rear end of the first arm and the rear end of the second arm to be changeable as the rear wheel moves upwardly and downwardly relative to said at least one structural member.

* * * * *